(12) United States Patent
Yoshimura (10) Patent No.: US 10,882,075 B2
(45) Date of Patent: Jan. 5, 2021

(54) VIBRATOR

(71) Applicant: Onkyo Corporation, Osaka (JP)

(72) Inventor: Hajime Yoshimura, Osaka (JP)

(73) Assignee: Onkyo Corporation, Osaka (JP)

( * ) Notice: Subject to any disclaimer, the term of this patent is extended or adjusted under 35 U.S.C. 154(b) by 0 days.

(21) Appl. No.: 16/408,567

(22) Filed: May 10, 2019

(65) Prior Publication Data

US 2019/0366383 A1    Dec. 5, 2019

(30) Foreign Application Priority Data

Jun. 4, 2018  (JP) .................................. 2018-107249
Oct. 12, 2018 (JP) .................................. 2018-193029

(51) Int. Cl.
*H02K 33/16*  (2006.01)
*B06B 1/04*   (2006.01)
*F16F 1/32*   (2006.01)

(52) U.S. Cl.
CPC .............. *B06B 1/045* (2013.01); *F16F 1/328* (2013.01); *H02K 33/16* (2013.01)

(58) Field of Classification Search
CPC .......... H02K 33/16; F16F 1/328; B06B 1/045
USPC ..................................................... 310/12.24
See application file for complete search history.

(56) References Cited

U.S. PATENT DOCUMENTS

| | | | |
|---|---|---|---|
| 4,967,871 A | 11/1990 | Komatsubara | |
| 5,622,358 A * | 4/1997 | Komura | F16F 1/328 267/166 |
| 6,404,085 B2 * | 6/2002 | Hamaguchi | B06B 1/045 310/81 |
| 6,758,465 B1 | 7/2004 | Greenhill et al. | |
| 7,023,112 B2 | 4/2006 | Miyamoto | |
| 7,372,968 B2 | 5/2008 | Buos | |
| 8,919,748 B2 * | 12/2014 | Urayama | F16F 7/1011 267/140.14 |
| 2001/0013729 A1 * | 8/2001 | Hamaguchi | H04R 1/005 310/81 |
| 2004/0017033 A1 * | 1/2004 | Ichikawa | F16F 7/108 267/140.14 |
| 2011/0057367 A1 * | 3/2011 | Hasegawa | F16F 7/1011 267/140.14 |

(Continued)

FOREIGN PATENT DOCUMENTS

| | | |
|---|---|---|
| JP | 63-158093 U1 | 10/1988 |
| JP | 2003-220363 A | 8/2003 |

(Continued)

*Primary Examiner* — Terrance L Kenerly (57) ABSTRACT

The vibrator includes a frame defining an internal space, a voice coil fixed to the frame in the internal space, a shaft member arranged along an axial direction of the coil in the internal space, a magnetic circuit arranged slidably relative to the shaft member and having a magnetic gap in which the coil is arranged, and a compression coil spring arranged between one end side of the magnetic circuit and one end side of the frame along the axial direction in the internal space. The compression coil spring is a coiled wave spring configured such that a plate-shaped steel wire is multiple-wound in a spiral shape in a circumferential direction of the shaft member to alternately form a peak portion and a trough portion at an equal interval and the peak portion and the trough portion contact each other in the axial direction.

8 Claims, 4 Drawing Sheets

(56) References Cited

U.S. PATENT DOCUMENTS

2013/0278084 A1 10/2013 Furuichi et al.
2014/0008948 A1 1/2014 Rockwell et al.
2014/0265651 A1 9/2014 Kim et al.

FOREIGN PATENT DOCUMENTS

| JP | 2003220363 | * | 8/2003 | ............ H02K 33/16 |
| JP | 2005-143277 A | | 6/2005 | |
| JP | 4080870 B | | 4/2008 | |
| KR | 10-2015-0089524 | | 8/2015 | |
| WO | 2008004729 A1 | | 1/2007 | |
| WO | WO-2008004729 A1 | * | 1/2008 | ............... G10K 9/13 |

* cited by examiner

VIBRATOR

BACKGROUND OF THE INVENTION

1. Field of the Invention

The present invention relates to a vibrator configured to convert an electric audio signal into vibration and attached to an attachment target member to vibrate the attachment target member to transmit vibration or emit a sound wave. Specifically, the present invention relates to a vibrator configured to provide, even though the vibrator is small, great vibration and provide stable operation.

2. Description of the Related Art

A vibrator is attached to an attachment target member to vibrate the attachment target member, thereby transmitting vibration and emitting a sound wave. An electrodynamic vibrator includes, for converting an electric audio signal into vibration, a magnetic circuit having a magnetic gap where a voice coil is arranged. Typically, in a vibrator configured to vibrate a magnetic circuit including a magnet, the magnetic circuit supported by a damper reciprocates and vibrates in a single given axial direction, thereby transmitting mechanical vibration via a frame. A voice coil in which current flows is, at one end thereof, fixed to the frame, and is arranged in a magnetic gap to generate drive force of vibration of the magnetic circuit.

In the electrodynamic vibrator as described above, the frame, the magnetic gap of the magnetic circuit, the voice coil, and the damper supporting a vibration section are, in many cases, in a circular shape and are arranged concentrically. Concentric arrangement of these components is similar to that in the case of audio reproduction in an electrodynamic speaker. The damper is sometimes called a suspension. The frame is sometimes called a case or a coupler.

For example, Japanese Patent No. 4080870 discloses an inertial exciter for acoustic emission. The inertial exciter has a magnet assembly, a coupler attached to a surface of an acoustic emitter and movable relative to the magnet assembly, a voice coil assembly attached to the coupler, and a suspension attached to the coupler and the magnet assembly and configured to support the magnet assembly on the coupler in the vicinity of the voice coil assembly. The suspension is a cantilever-shaped flat arm member substantially arranged in a single plane passing through the center of gravity of the magnet assembly, and therefore, moment acting on the suspension is reduced.

The damper or the suspension of the vibrator is for center holding of the voice coil/magnetic circuit. For achieving balance between drive force and support force for a vibration system and increasing mechanical vibration to be generated without distortion or noise due to unbalance, an electrodynamic vibrator having a relatively-larger outer dimension than the diameter of a magnetic circuit is used. As a result, there is a problem that the entirety of the vibrator tends to be large as compared to the size of the magnetic circuit. On the other hand, a small vibrator has a problem that a magnetic circuit is relatively small, and as a result, vibration tends to be small. Further, the damper or the suspension of the vibrator has a problem that a load on the cantilever-shaped flat arm member specifically called a butterfly damper increases in term of strength as the amount of displacement in a vibration direction increases and such an arm member is easily ruptured due to weakness in a direction perpendicular to the vibration direction in terms of strength.

Thus, JP-UM-A-63-158093 describes a typical vibrator configured such that a shaft and a bearing restrained in a direction perpendicular to a vibration direction of a magnetic circuit are provided. For example, an electric machine vibration conversion device including a magnetic circuit, a drive coil positioned in an airgap of the magnetic circuit, a coil bobbin configured such that the drive coil is wound around the coil bobbin and configured to transmit movement of the drive coil to an outer case, and a damper supporting the magnetic circuit on the outer case is disclosed. The electric machine vibration conversion device includes a guide hole formed along a sound axis direction at a center position of the magnetic circuit, and a coupling member fitted in the guide hole and coupled to the outer case at an end portion. The electric machine vibration conversion device is configured so that drive force generated at the drive coil can be transmitted only in the sound axis direction.

Moreover, JP-A-2003-220363 discloses an axially-driven vibrator configured such that a cylindrical drive coil is fixed to one side end of a cylindrical frame and a driver including a cup-shaped yoke and a circular columnar permanent magnet as magnetic materials magnetically engaging with each other through the drive coil and a gap is arranged to vibrate in an axial direction by a pair of coil springs provided on both side ends of the frame. Further, JP-A-2005-143277 discloses a vibration actuator using a wave spring instead of a coil spring. Note that there has been no typical vibrator configured to generate vibration and using a wave spring instead of a coil spring.

The present invention has been made for solving the problems of the above-described typical techniques. An objective of the present invention relates to a vibrator, and is to provide a vibrator configured such that the entirety of the vibrator is not large as compared to the size of a magnetic circuit, great vibration is provided even though the vibrator is small, and stable operation is provided.

SUMMARY OF THE INVENTION

A vibrator of the present invention includes a frame defining an internal space, a voice coil fixed, at a bobbin around which a coil is wound, to the frame in the internal space, a shaft member arranged along an axial direction of the coil in the internal space and having both ends supported on the frame, a magnetic circuit arranged slidably relative to the shaft member and having a magnetic gap in which the coil is arranged, and a compression coil spring arranged between one end side of the magnetic circuit and one end side of the frame along the axial direction in the internal space. The compression coil spring is a coiled wave spring configured such that a plate-shaped steel wire is multiple-wound in a spiral shape in a circumferential direction of the shaft member to alternately form a peak portion and a trough portion at an equal interval and the peak portion and the trough portion contact each other in the axial direction.

Preferably, the vibrator of the present invention further includes another coiled wave spring arranged between the other end side of the magnetic circuit and the other end side of the frame.

Preferably, in the vibrator of the present invention, each coiled wave spring is attached in a state in which each coiled wave spring is biased and compressed to be shorter than a natural length.

Preferably, in the vibrator of the present invention, the magnetic circuit has a bearing slidable relative to the shaft member.

Preferably, in the vibrator of the present invention, the magnetic circuit includes a yoke having a through-hole through which the shaft member penetrates, a magnet having a through-hole through which the shaft member penetrates and attached to the yoke, and a plate having a through-hole through which the shaft member penetrates and attached to the magnet to form the magnetic gap between the plate and the yoke.

Preferably, in the vibrator of the present invention, the yoke of the magnetic circuit further includes a flange portion having a smaller thickness dimension D2 than the maximum thickness dimension D1 of the magnetic circuit in the axial direction and formed to protrude outward in the circumferential direction perpendicular to the axial direction, and the coiled wave spring is fixed to the flange portion.

Preferably, in the vibrator of the present invention, the yoke of the magnetic circuit further includes a flange portion having a smaller thickness dimension D3 than the maximum thickness dimension D1 of the magnetic circuit in the axial direction and formed to protrude inward of the through-hole in the circumferential direction perpendicular to the axial direction, and the coiled wave spring is fixed to the flange portion.

Preferably, in the vibrator of the present invention, the yoke of the magnetic circuit has, at an outer-diameter-side surface defining an outer diameter, a groove formed along the circumferential direction perpendicular to the axial direction, a retaining ring member fitted in the groove is further provided, and the coiled wave spring is fixed to the retaining ring member fitted and fixed to the groove of the yoke.

Preferably, in the vibrator of the present invention, the yoke of the magnetic circuit has, at the outer-diameter-side surface defining the outer diameter, the groove formed along the circumferential direction perpendicular to the axial direction. The coiled wave spring has a retaining ring portion formed to protrude in an inner diameter direction, and the retaining ring portion is fitted and fixed to the groove of the yoke.

Hereinafter, features of the present invention will be described.

The vibrator of the present invention includes the frame defining the internal space, the voice coil fixed, at the bobbin around which the coil is wound, to the frame in the internal space, the shaft member arranged along the axial direction of the coil in the internal space and having both ends supported on the frame, the magnetic circuit arranged slidably relative to the shaft member and having the magnetic gap in which the coil is arranged, and the compression coil spring arranged between one end side of the magnetic circuit and one end side of the frame along the axial direction in the internal space.

Thus, the vibrator includes the shaft member supported on the frame at both ends. Thus, the center of the vibrating magnetic circuit can be held such that the magnetic circuit is vibratable relative to the shaft member, and operation is stabilized. Moreover, the magnetic circuit preferably includes the bearing slidable relative to the shaft member, and preferably includes the yoke having the through-hole through which the shaft member penetrates, the magnet having the through-hole through which the shaft member penetrates and attached to the yoke, and the plate having the through-hole through which the shaft member penetrates and attached to the magnet to form the magnetic gap between the plate and the yoke.

The compression coil spring of the vibrator of the present invention is the coiled wave spring configured such that the plate-shaped steel wire is multiple-wound in the spiral shape in the circumferential direction of the shaft member to alternately form the peak portion and the trough portion at the equal interval and the peak portion and the trough portion contact each other in the axial direction. The vibrator preferably further includes another coiled wave spring arranged between the other end side of the magnetic circuit and the other end side of the frame. Moreover, the coiled wave spring is preferably attached in a state in which the coiled wave spring is biased and compressed to be shorter than the natural length. Even in a case where such great force that a normal coil spring is plastically deformed is applied in a compression direction, the coiled wave spring fulfills the displacement limiting function of causing plate-shaped steel wire portions to closely contact each other to stop displacement. Thus, even in a case where the magnetic circuit greatly displaces, operation can be stabilized.

The yoke of the magnetic circuit of the vibrator may further include the flange portion having the smaller thickness dimension D2 than the maximum thickness dimension D1 of the magnetic circuit in the axial direction and formed to protrude outward in the circumferential direction perpendicular to the axial direction, and the coiled wave spring may be fixed to the flange portion. The magnetic circuit is housed inside the coiled wave spring. Thus, the vibrator can be configured such that the thickness dimension of the vibrator in the axial direction is reduced, the shape of the vibrator is smaller as compared to the size of the vibratable magnetic circuit, and great vibration is provided.

The yoke of the magnetic circuit of the vibrator may further include the flange portion having the smaller thickness dimension D3 than the maximum thickness dimension D1 of the magnetic circuit in the axial direction and formed to protrude inward of the through-hole in the circumferential direction perpendicular to the axial direction, and the coiled wave spring may be fixed to the inner peripheral side flange portion. The coiled wave spring is housed inside the through-hole of the magnetic circuit. Thus, the vibrator can be configured such that the thickness dimension of the vibrator in the axial direction is reduced, the shape of the vibrator is smaller as compared to the size of the vibratable magnetic circuit, and great vibration is provided.

The yoke of the magnetic circuit of the vibrator may have, at the outer-diameter-side surface defining the outer diameter, the groove formed along the circumferential direction perpendicular to the axial direction. The retaining ring member fitted in the groove may be further provided. The coiled wave spring may be fixed to the retaining ring member fitted and fixed to the groove of the yoke. The retaining ring member fitted and fixed to the groove of the yoke may be replaced with the retaining ring portion formed to protrude in the inner diameter direction of the coiled wave spring. As compared to the case of providing a flange portion protruding outward in the circumferential direction at the yoke of the magnetic circuit, the vibrator can be easily manufactured, and a cost can be reduced.

According to the vibrator of the present invention, the vibrator can be configured such that the entirety of the vibrator is not large as compared to the size of the magnetic circuit, and the vibrator can be realized such that great vibration is provided even though the vibrator is small and stable operation is provided.

DETAILED DESCRIPTION OF THE PREFERRED EMBODIMENTS

Hereinafter, vibrators according to preferred embodiments of the present invention will be described, but the present invention is not limited to these embodiments.

First Embodiment

Figure 1:
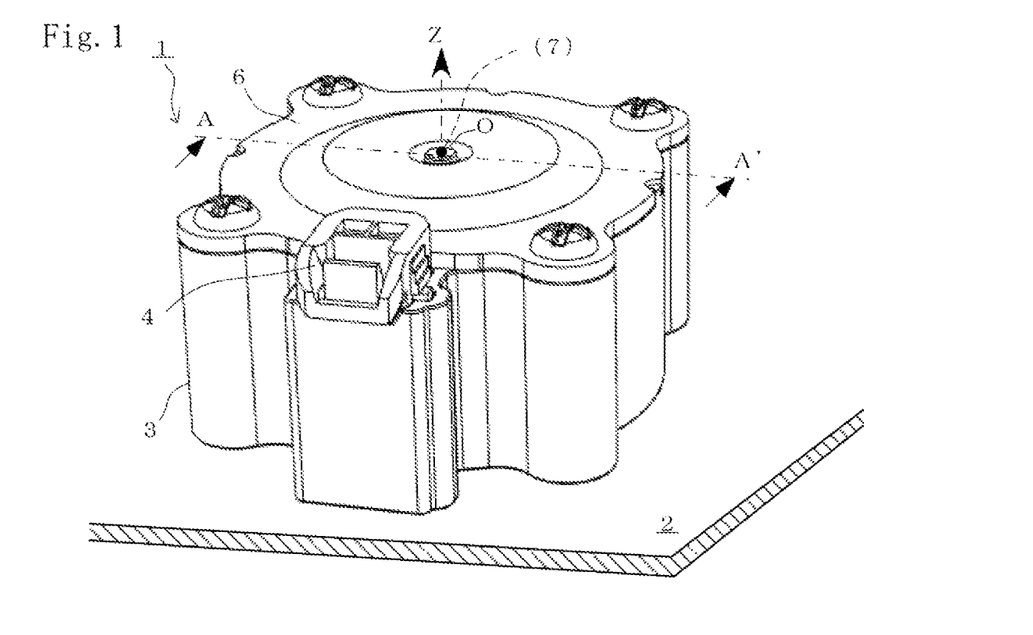
FIG. 1 is a view for describing a vibrator according to a preferred embodiment of the present invention.
Figure 2:
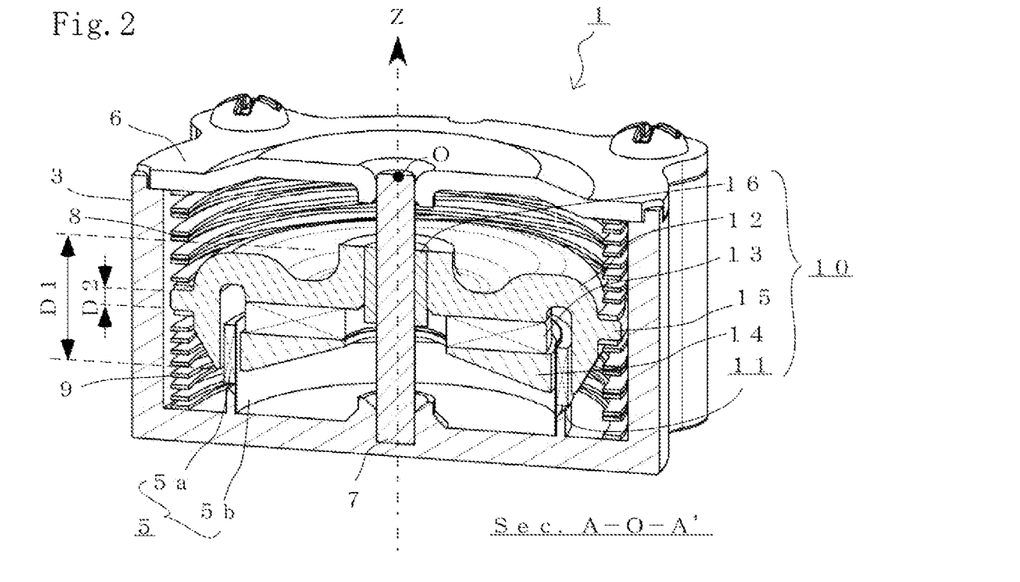
FIG. 2 is a view for describing an internal structure of the vibrator according to the preferred embodiment of the present invention.

FIGS. 1 and 2 are views for describing a vibrator 1 according to a preferred embodiment of the present invention. Specifically, FIG. 1 is a perspective view of the vibrator 1 attached to a flat plate 2 as an attachment target member. Moreover, FIG. 2 is a sectional view of an internal structure of the vibrator 1 in an A-O-A' section of FIG. 1. Note that some configurations unnecessary for description of the present invention are not shown in the figures and are not described. Needless to say, the form of the vibrator 1 is not limited to the case of the present embodiment.

The vibrator 1 of the present embodiment is an electrodynamic vibrator including a frame 3 and a flange member 6 defining an entire shape and including an internal magnet type magnetic circuit 10 in a substantially cylindrical internal space. The vibrator 1 is attached to the flat plate 2 so that the flat plate 2 can vibrate to emit a sound wave. The vibrator 1 having a terminal 4 to which audio signal current is to be input generates drive force changeable in an alternating manner along a Z-axis direction passing through an illustrated center point O, thereby vibrating the flat plate 2. The vibrator 1 is, on a bottom surface side of the frame 3, attached to the flat plate 2. For example, at the frame 3 formed from a non-magnetic member such as resin, the vibrator 1 is, with (not-shown) screws, screwed into (not-shown) screw holes provided at the flat plate 2.

The frame 3 is a recessed member made of a resin material or a non-magnetic metal material, and has such a structure that the flange member 6 is screwed into an opening portion of the frame 3. Similarly, the flange member 6 is made of a resin material or a metal material, and the flange member 6 and the frame 3 together form a frame of the vibrator 1. The relatively-small vibrator 1 is configured such that an A-A' dimension passing through a center axis Z is about 42.0 mm and a total height is about 23.0 mm.

Moreover, the frame 3 and the flange member 6 are configured such that a later-described shaft member 7 is arranged in an internal space of the frame and both ends of the shaft member 7 are supported along the Z-axis direction. The shaft member 7 is a shaft-shaped member made of a non-magnetic metal material. For example, the shaft member 7 is a stainless-steel round bar having a diameter of about 3.0 mm. As in the present embodiment, an adhesive or the like may be used in combination to fix the shaft member 7 to the frame.

The internal magnet type magnetic circuit 10 includes a yoke 12, a magnet 13, and a plate 14. The magnetic circuit 10 of the vibrator 1 has, for converting an input electric audio signal into vibration, a magnetic gap 11 where a voice coil 5 is arranged. The annular magnetic gap 11 is defined between an outer peripheral end surface of the discoid plate 14 and an inner peripheral end surface of the recessed yoke 12, and a strong DC magnetic field is generated by magnetic force from the magnet 13.

The magnetic circuit 10 has a bearing 16 slidable relative to the shaft member 7. The yoke 12, the magnet 13, and the plate 14 each have through-holes through which the shaft member 7 penetrates. In the case of the present embodiment, the bearing 16 is fixed to the through-hole provided at the yoke 12. The bearing 16 is configured such that a through-hole is provided at the center of a substantially cylindrical base, and the shaft member 7 slidably penetrates such a through-hole.

For example, the bearing 16 is a sintered oil-impregnated bearing formed in such a manner that a porous metal body manufactured by powder metallurgy is impregnated with lubricant oil. The sintered oil-impregnated bearing is configured such that the oil oozes out of the inside of the bearing to a sliding surface to form a lubricant oil film, and therefore, the bearing 16 can smoothly slide relative to the shaft member 7. Meanwhile, movement of the shaft member 7 and the bearing 16 is, with almost no backlash, restricted in other directions than the Z-axis direction. Thus, the magnetic circuit 10 is held at the center by the shaft member 7 and the bearing 16, and is vibratable only in the Z-axis direction.

In the case of the present embodiment, the shape dimensions of the internal magnet type magnetic circuit 10 are dominated by the shape dimensions of the yoke 12. The maximum thickness dimension D1 of the internal magnet type magnetic circuit 10 is substantially the total height dimension of the yoke 12, and is about 10.5 mm. A flange portion 15 partially protruding outward in a circumferential direction perpendicular to the Z-axis direction is formed at the yoke 12. The thickness dimension D2 of the flange portion 15 is about 1.6 mm, and is a smaller value than the above-described thickness dimension D1. Coiled wave springs 8, 9 described later are fixed to the flange portion 15 protruding outward.

The voice coil 5 includes a coil 5a arranged in the magnetic gap 11 of the magnetic circuit 10, and a bobbin 5b around which the coil 5a is wound in the Z-axis direction on one end side. The other end side of the bobbin 5b of the voice coil 5 is attached to the bottom surface side of the frame 3. Note that the terminal 4 connected to a (not-shown) coil wire drawn from the coil 5a of the voice coil 5 is provided at the frame 3, and the audio signal current is input to the terminal 4.

The vibrator 1 includes the elastic coiled wave springs 8, 9 vibratably coupling the magnetic circuit 10 and the frame (the frame 3 and the flange member 6) to each other. The coiled wave spring 8 is arranged on a flange member 6 side above the illustrated magnetic circuit 10. Moreover, the coiled wave spring 9 is arranged on a frame 3 side below the illustrated magnetic circuit 10. In the vibrator 1 of the present embodiment, the frame 3 and the voice coil 5 are fixed to the flat plate 2, and therefore, the drive force generated at the coil 5a arranged in the magnetic gap 11 of the magnetic circuit 10 vibrates the magnetic circuit 10 to generate relative displacement of the magnetic circuit 10.

That is, the coiled wave springs 8, 9 elastically supports/couples the magnetic circuit 10 relative to the frame, the magnetic circuit 10 being held at the center by the shaft member 7 and the bearing 16 and being configured slidable in the Z-axis direction. Thus, the magnetic circuit 10 is vibratable in the Z-axis direction. The magnetic circuit 10 includes the yoke 12 and the plate 14 as magnetic materials and the magnet 13, and therefore, the weight of the magnetic circuit 10 is relatively great. Thus, as the magnetic circuit 10 vibrates, reaction force for the drive force acts to vibrate the flat plate 2.

Figure 3:
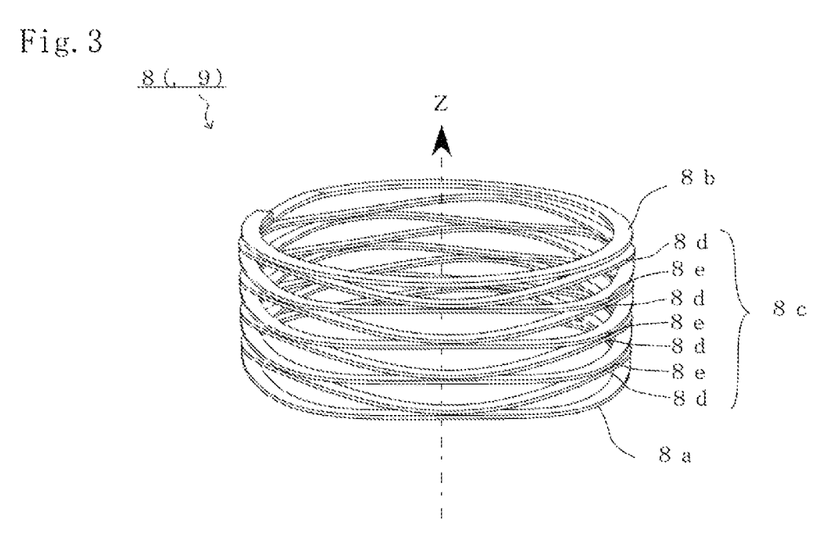
FIG. 3 is a view for describing a coiled wave spring of the vibrator according to the preferred embodiment of the present invention.

FIG. 3 is a view for describing the coiled wave springs 8, 9. In the vibrator 1 of the present embodiment, the same spring is used in common as the coiled wave springs 8, 9, and therefore, a configuration of the coiled wave spring 8 will be described below.

The coiled wave spring 8 is a compression coil spring formed in such a manner that a plate-shaped steel wire using, as a material, spring stainless steel having a thickness of 0.4 mm and a width of 1.65 mm is multiple-wound with about eight turns in the illustrated Z-axis direction in the shape of a spiral having a diameter of about 34.4 mm. The coiled wave spring 8 has a first fixing portion 8a coupled to the magnetic circuit 10, and a second fixing portion 8b coupled to the flange member 6 forming the frame. The first fixing portion 8a and the second fixing portion 8b as retaining ring portions corresponding to a winding start end side and a winding terminal end side are formed in such a manner that a plate-shaped steel wire with no undulation is wound to an extent shorter than about a single turn.

Moreover, the coiled wave spring 8 is configured such that an elastically-deformable elastic deformation portion 8c is formed between the first fixing portion 8a and the second fixing portion 8b. At the elastic deformation portion 8c, the plate-shaped steel wire is shaped such that peak portions 8d and trough portions 8e are alternately formed at equal intervals. In addition, at the elastic deformation portion 8c at which the wire is multiple-wound in the spiral shape, it is configured such that the peak portions 8d and the trough portions 8e contact each other in the Z-axis direction.

The peak portions 8d and the trough portions 8e are undulating portions which are not formed at a plate-shaped steel wire in the case of a normal compression coil spring formed in such a manner that the plate-shaped steel wire is linearly wound. In the case of the present embodiment, the height of the undulation is about 0.57 mm. In a case where a projection to one direction along a Z-axis is the peak portion 8d, a portion recessed in the other direction is the trough portion 8e. Thus, the peak portions 8d and the trough portions 8e of the coiled wave spring 8 are sometimes reversed depending on a viewing direction.

The peak portions 8d and the trough portions 8e of the coiled wave spring 8 are alternately formed at equal intervals within a substantially single turn of the spiral winding. Moreover, it is configured such that the peak portions 8d and the trough portions 8e contact each other in the Z-axis direction. In the case of, e.g., a certain portion starting from the trough portion 8e and corresponding to a single turn in the present embodiment, three groups of the peak portions 8d and the trough portions 8e are formed within about the single turn, and a subsequent peak portion 8d contacting the first trough portion 8e is lastly formed.

The coiled wave spring 8 is configured such that the peak portions 8d and the trough portions 8e contact each other in a no-load/force state in which a natural length is 13.0 mm. In a case where load/force is applied in a compression direction, the peak portions 8d and the trough portions 8e constantly contact each other in the coiled wave spring 8. Moreover, in a case where load/force is applied in a stretching direction in which the coiled wave spring 8 becomes longer than the natural length, it is configured such that the peak portions 8d and the trough portions 8e are separated from each other without contact in the coiled wave spring 8.

Thus, even in the case of compression due to great force applied in the compression direction, the elastic deformation portion 8c of the coiled wave spring 8 can respond to greater force. As a result, failure such as plastic deformation or rupturing beyond a threshold can be avoided. This is because the amplitude limiting function of causing the peak portions 8d and the trough portions 8e of the elastic deformation portion 8c to contact each other is provided, and therefore, plate-shaped steel wire portions closely contact each other to stop displacement. With the coiled wave spring 8 having realistic material/shape/dimensions, even in a case where such great compression force that a normal coil spring is plastically deformed beyond a threshold is applied, the peak portions 8d and the trough portions 8e contact each other, and therefore, spring functions can be normally fulfilled due to deformation of the peak portions 8d and the trough portions 8e.

The vibrator 1 of the present embodiment is configured such that the magnetic circuit 10 is sandwiched between the first fixing portions of two coiled wave springs 8, 9 arranged one above the other. The second fixing portions of two coiled wave springs 8, 9 on the other side thereof are fixed to the frame. Two coiled wave springs 8, 9 are attached to constantly generate restorative force for stretching in a state in which each of the coiled wave springs 8, 9 is biased and compressed to be shorter than the natural length. Thus, the drive force generated at the coil 5a arranged in the magnetic gap 11 of the magnetic circuit 10 can vibrate the magnetic circuit 10 and the frame relative to each other.

The elastic deformation portions 8c of the coiled wave springs 8, 9 are not limited to the configuration with the peak portions 8d and the trough portions 8e as described above. Configurations of the peak portions 8d and the trough portions 8e of the elastic deformation portion 8c stretchable in the Z-axis direction are changed so that the spring constant, i.e., hardness/softness/stiffness/compliance, of the elastic deformation portion 8c can be adjusted. For example, when the heights and lengths of the undulations of the peak portion 8d and the trough portion 8e and the number of groups of the peak portions 8d and the trough portions 8e are changed, the spring constant of the elastic deformation portion 8c changes. The elastic deformation portions 8c of the coiled wave springs 8, 9 are formed from the plate-shaped steel wires exhibiting rigidity, and therefore, there is an advantage that the value of a resonant frequency Q at the resonant frequency f0 of the vibrator 1 can be moderately suppressed low.

Moreover, the coiled wave springs 8, 9 are basically the compression coil springs formed in such a manner that the steel wires are multiple-wound in the spiral shape, and therefore, the first fixing portion 8a, the second fixing portion 8b, and the elastic deformation portion 8c are formed with the substantially same outer dimension. As a result, the coiled wave springs 8, 9 are entirely in a substantially cylindrical shape, and on the inside thereof, spaces are formed. Thus, the magnetic circuit 10 and the shaft member 7 can be substantially housed inside these spaces.

Specifically, the coiled wave spring 8, 9 is, on one end side thereof, fixed to the flange member 6 or the frame 3 forming the frame, and on the other end side, is fixed to the flange portion 15 of the yoke 12 forming the magnetic circuit 10. The flange portion 15 is a portion protruding outward of the yoke 12 by the thickness dimension D2, and therefore, the magnetic circuit 10 having the maximum thickness dimension D1 as a greater dimension than the thickness dimension D2 is substantially housed inside the coiled wave springs 8, 9.

If one end side of each of the coiled wave springs 8, 9 is fixed to a corresponding one of the uppermost end and the lowermost end of the magnetic circuit 10 having the maximum thickness dimension D1, the thickness dimension of the vibrator 1 in the Z-axis direction is a great dimension corresponding to the sum of the natural lengths of two coiled wave springs 8, 9 and the maximum thickness dimension D1 of the magnetic circuit 10. Note that the coiled wave springs 8, 9 can generate a similar level of load at the substantially half of the height of the compression coil spring, and therefore, the vibrator 1 can have a smaller configuration as compared to the case of using the typical compression coil spring.

If the vibrator includes, as in a typical technique, a substantially flat plate-shaped member such as a damper or a suspension instead of the coiled wave springs 8, 9 and is in such a shape that the inner diameter dimension of the second fixing portion is extremely smaller than the outer diameter dimension defining the first fixing portion, when the same outer diameter dimension is applied, the size of the magnetic circuit 10 housed inside is relatively reduced. In this case, the drive force to be generated is likely to be smaller due to reduction in the size of the magnetic circuit 10. Further, the weight of the magnetic circuit 10 is likely to be smaller, and vibration to be generated for the flat plate 2 is likely to be smaller.

Note that as described above, the coiled wave springs 8, 9 are fixed to the flange portion 15 of the yoke 12 forming the magnetic circuit 10. Thus, in the vibrator 1 of the present embodiment, the thickness dimension in the Z-axis direction can be reduced as compared to the thickness dimension of the vibratable magnetic circuit 10. In other words, in the vibrator 1 of the present embodiment, the size of the magnetic circuit 10 housed inside the coiled wave springs 8, 9 can be, as compared to a typical case, increased relative to the entire size of the vibrator 1. As a result, the vibrator 1 can be configured such that the shape of the frame is smaller than the size of the vibratable magnetic circuit 10 and great vibration can be provided.

Meanwhile, the coiled wave springs 8, 9 are configured such that the elastic deformation portions 8c are in a shape not protruding in an inner diameter direction or an outer diameter direction and the magnetic circuit 10 and the shaft member 7 are substantially housed inside the coiled wave springs 8, 9. Thus, two coiled wave springs 8, 9 define the entire size of the vibrator 1. Thus, in the vibrator 1, the size of the magnetic circuit 10 housed inside the coiled wave springs 8, 9 can be, as compared to the typical case, increased relative to the entire size of the vibrator 1. As a result, the vibrator 1 can be realized, which provides great vibration even though the vibrator 1 is small and provides stable operation.

The coiled wave springs 8, 9 described above may sometimes merely called wave springs. Moreover, the coiled wave springs 8, 9 may be those including or not including the retaining ring portions.

With the coiled wave springs 8, 9, the size of the vibrator 1 of the present embodiment can be reduced as described above. As a result, there are advantages that a cost for the step of manufacturing the vibrator 1 is reduced and a quality is stabilized. When the signal current flows in the voice coil 5, the temperature of the magnetic circuit 10 increases due to generated heat, and therefore, the coiled wave springs 8, 9 housing the magnetic circuit 10 inside fulfill the function of emitting the heat accumulated in the magnetic circuit 10.

If the typical compression coil springs formed in such a manner that the steel wires are multiple-wound in the spiral shape are used instead of the coiled wave springs 8, 9, when strong compression force is applied, the normal coil springs are plastically deformed beyond the threshold, leading to a probability that the coil springs are damaged. In this case, the material and dimensions of the compression coil spring need to be increased in size to withstand the strong compression force. As a result, there is a probability that the entirety of the vibrator including the compression coil springs is increased in size.

Note that the vibrator 1 of the present embodiment uses the coiled wave springs 8, 9 as described above, but may include only either one of the coiled wave springs. This is because only either one of the coiled wave springs 8, 9 can operate as a coil spring to be compressed/stretched. The vibrator including only either one of the coiled wave springs has an advantage that further size reduction can be realized.

Moreover, the vibrator 1 of the present embodiment includes the shaft member 7 of which both ends are supported on the frame such that the magnetic circuit 10 is vibratable toward an end side in the Z-axis direction as a vibration direction, and the magnetic circuit 10 further has the bearing 16 slidable relative to the shaft member 7. Note that the magnetic circuit 10 does not necessarily include the bearing 16 as long as the magnetic circuit 10 has a configuration allowing sliding relative to the shaft member 7. As long as movement of the magnetic circuit 10 relative to the shaft member 7 in the circumferential direction perpendicular to the Z-axis direction can be restricted to avoid the coil 5a of the voice coil 5 in the magnetic gap 11 from contacting the magnetic circuit 10, the magnetic circuit 10 does not necessarily include the bearing 16, and may have a through-hole through which the shaft member 7 penetrates.

Further, in the vibrator 1 of the present embodiment, both ends of the shaft member 7 are supported in a fixed manner on the frame 3 and the flange member 6. However, it may be configured such that the shaft member 7 supported on the frame is slidable relative to the frame. For example, bearings configured to slidably support the shaft member 7 may be provided at the frame 3 and the flange member 6. In this case, it is preferably configured such that the shaft member 7 is fixed to the magnetic circuit 10.

Second Embodiment

Figure 4:
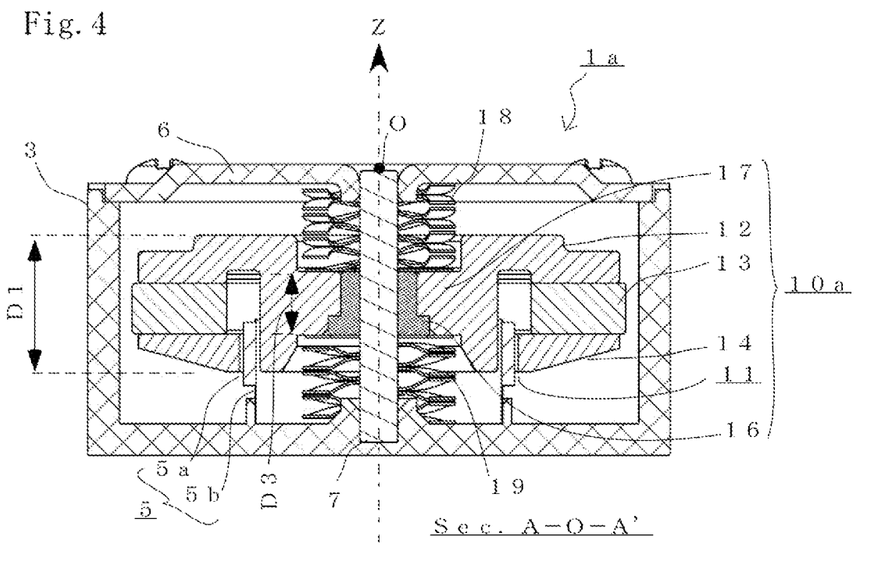
FIG. 4 is a view for describing a vibrator according to another preferred embodiment of the present invention.

FIG. 4 is a view for describing a vibrator 1a according to another preferred embodiment of the present invention. Specifically, FIG. 4 is a sectional view of an internal structure of the vibrator 1a in an A-O-A' section similar to that of FIG. 2. Note that as in the case of the above-described embodiment, the same reference numerals are used to represent some configurations unnecessary for description of the present invention, and these configurations are not shown in the figure and are not described. Needless to say, the form of the vibrator 1*a* is not limited to the case of the present embodiment.

The vibrator 1*a* of the present embodiment is an electro-dynamic vibrator having a substantially cylindrical entire shape and including a larger voice coil 5 as compared to the case of the previous embodiment and an external magnet type magnetic circuit 10*a*. Thus, the vibrator 1*a* is configured such that a coiled wave spring 8, 9 is not fixed to the flange portion 15 provided on the outer peripheral side of the magnetic circuit 10, but a flange portion 17 is provided on an inner peripheral side of the magnetic circuit 10*a* and a coiled wave spring 18, 19 is fixed to the flange portion 17. The vibrator 1*a* is attached to a (not-shown) flat plate 2 so that the flat plate 2 can vibrate to emit a sound wave. The vibrator 1*a* to which audio signal current is to be input generates, as in the previous embodiment, drive force changeable in an alternating manner along a Z-axis direction passing through an illustrated center point O, thereby vibrating the flat plate 2.

The external magnet type magnetic circuit 10*a* includes a pole 12 equivalent to a yoke, a magnet 13, and a plate 14. The magnetic circuit 10*a* of the vibrator 1*a* has, for converting an input electric audio signal into vibration, a magnetic gap 11 where the voice coil 5 is arranged. The annular magnetic gap 11 is defined between an outer peripheral end surface of a raised tip end portion of the pole 12 and an inner peripheral end surface of the annular plate 14, and a strong DC magnetic field is generated by magnetic force from the magnet 13. A through-hole through which a Z-axis passes is provided at a center pole of the pole 12, and therefore, the bearing 16 is fixed to such a through-hole. A through-hole is provided at the center of a substantially cylindrical base of the bearing 16, and a shaft member 7 slidably penetrates such a through-hole.

In the case of the present embodiment, the shape dimensions of the external magnet type magnetic circuit 10*a* are dominated by the shape dimensions of the pole 12, and the maximum thickness dimension D1 of the external magnet type magnetic circuit 10*a* is substantially the total height dimension of the pole 12. The flange portion 17 partially protruding inward in a circumferential direction perpendicular to the Z-axis direction is formed at the pole 12, and a through-hole is formed at the center of the flange portion 17. The thickness dimension D3 of the flange portion 17 is a smaller value than the above-described thickness dimension D1. The coiled wave springs 18, 19 are fixed to the flange portion 17 protruding inward.

The vibrator 1*a* includes the coiled wave springs 18, 19 coupling, at the flange portion 17 on the inner peripheral side of the magnetic circuit 10*a*, the magnetic circuit 10*a* and a frame (a frame 3 and a flange member 6) so that the magnetic circuit 10*a* and the frame can vibrate relative to each other. Although specific shape dimensions are different from the coiled wave springs 8, 9 of the previous embodiment, the coiled wave springs 18, 19 basically have materials and configurations similar to those of the coiled wave springs 8, 9. The same spring is used in common as the coiled wave springs 18, 19.

In the vibrator 1*a* of the present embodiment, the voice coil 5 and the frame 3 are fixed to the flat plate 2, and therefore, the drive force generated at the coil 5*a* arranged in the magnetic gap 11 of the magnetic circuit 10*a* vibrates the magnetic circuit 10*a* to generate relative displacement of the magnetic circuit 10*a*. The shaft member 7 and the coiled wave springs 18, 19 couple the magnetic circuit 10*a* and the frame so that the magnetic circuit 10*a* and the frame can vibrate relative to each other, and therefore, the magnetic circuit 10*a* is vibratable. The magnetic circuit 10*a* includes the pole 12 and the plate 14 as magnetic materials and the magnet 13, and therefore, the weight of the magnetic circuit 10*a* is relatively great. Thus, as the magnetic circuit 10*a* vibrates, reaction force for the drive force acts to vibrate the flat plate 2.

As in the previous embodiment, an elastically-deformable elastic deformation portion is formed between a first fixing portion and a second fixing portion at the coiled wave spring 18, 19. At the elastic deformation portion, a plate-shaped steel wire is shaped such that peak portions and trough portions are alternately formed at equal intervals. In addition, at the elastic deformation portion multiple-wound in a spiral shape, it is configured such that the peak portions and the trough portions contact each other in the Z-axis direction. The peak portions and the trough portions of the coiled wave spring are alternately formed at equal intervals within about a single turn of the spiral winding.

Thus, even in the case of compression due to great force applied in a compression direction, the elastic deformation portion of the coiled wave spring 18, 19 can respond to greater force. As a result, failure such as plastic deformation or rupturing beyond a threshold can be avoided. The vibrator 1*a* of the present embodiment is configured such that the magnetic circuit 10*a* is sandwiched between two coiled wave springs 18, 19 arranged one above the other. Two coiled wave springs 18, 19 are, on the other side thereof, fixed to the frame. Two coiled wave springs 18, 19 are attached to constantly generate restorative force for stretching in a state in which each of the coiled wave springs 18, 19 is biased and compressed to be shorter than a natural length. Thus, the drive force generated at the coil 5*a* arranged in the magnetic gap 11 of the magnetic circuit 10*a* can vibrate the magnetic circuit 10*a* and the frame relative to each other.

Specifically, the coiled wave spring 18, 19 is, on one end side thereof, fixed to the flange member 6 or the frame 3 forming the frame, and on the other end side, is fixed to the flange portion 17 on the inner peripheral side of the pole 12 forming the magnetic circuit 10*a*. The flange portion 17 is a portion protruding toward the inner peripheral side of the pole 12 by the thickness dimension D3, and therefore, the magnetic circuit 10*a* having the maximum thickness dimension D1 as a dimension greater than the thickness dimension D3 can house part of the coiled wave springs 18, 19, and can reduce the thickness dimension of the vibrator 1*a* in the Z-axis direction to decrease the vibrator 1*a* in size.

Note that the vibrator 1*a* of the present embodiment uses the coiled wave springs 18, 19 as described above, but may include only either one of the coiled wave springs. The vibrator including only either one of the coiled wave springs has an advantage that further size reduction can be realized.

Third Embodiment

Figure 5:
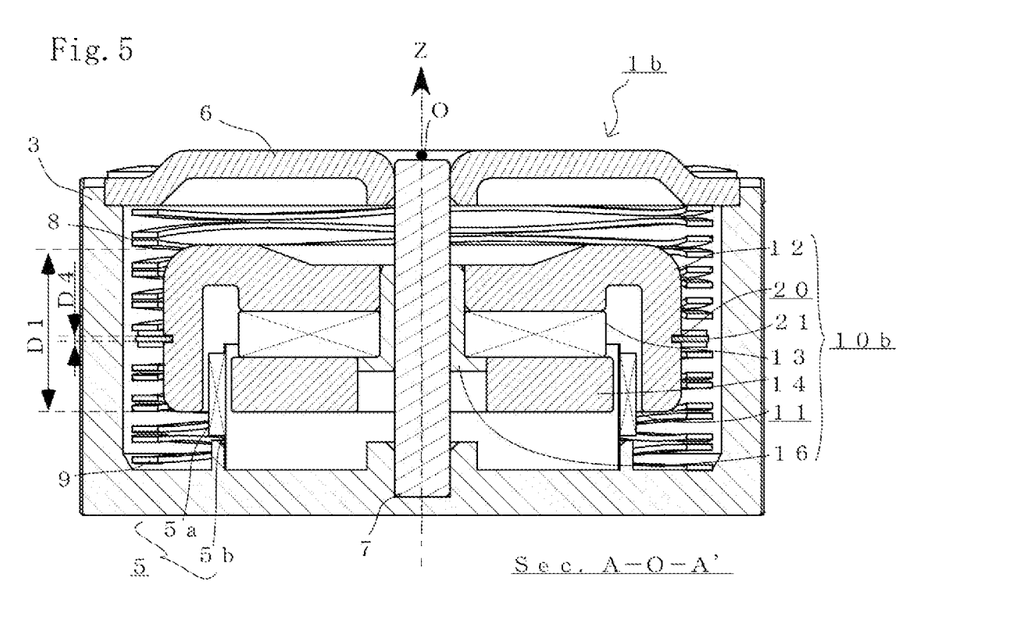
FIG. 5 is a view for describing a vibrator according to still another preferred embodiment of the present invention.
Figure 6:
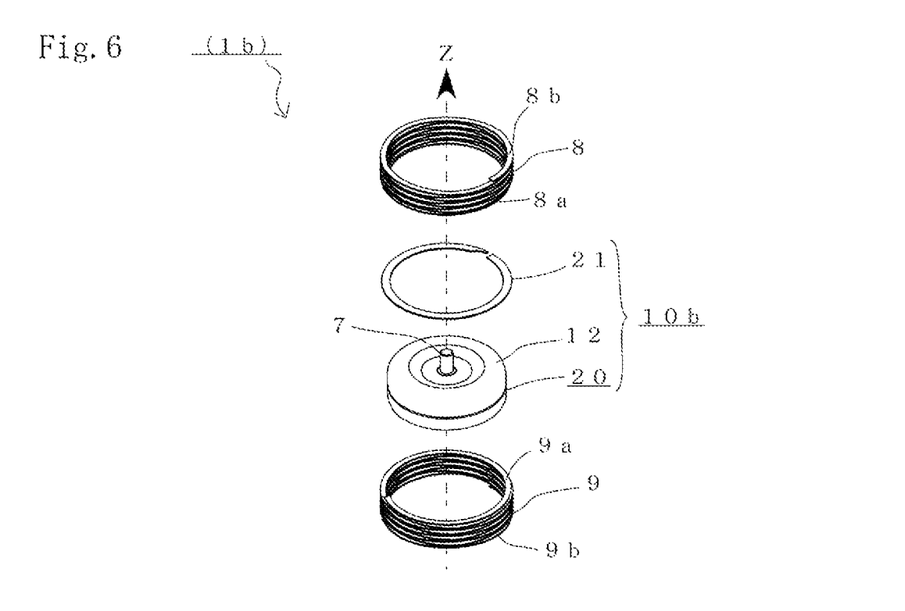
FIG. 6 is a view for describing an internal structure of the vibrator according to the still another preferred embodiment of the present invention.

FIGS. 5 and 6 are views for describing a vibrator 1*b* according to still another embodiment of the present invention. Specifically, FIG. 5 is a sectional view of an internal structure of the vibrator in an A-O-A' section similar to that of FIG. 2, and FIG. 6 is an exploded perspective view illustrating only a shaft member 7, coiled wave springs 8, 9, and a magnetic circuit 10*b* arranged inside a frame. Note that as in the cases of the above-described embodiments, the same reference numerals are used to represent some configurations unnecessary for description of the present invention, and these configurations are not shown in the figures and are not described. Needless to say, the form of the vibrator 1b is not limited to the case of the present embodiment.

The vibrator 1b is an electrodynamic vibrator having a substantially cylindrical entire shape and including the internal magnet type magnetic circuit 10b as in the vibrator 1 of the previous embodiment. Note that the vibrator 1b is different from that of the previous embodiment in a configuration of the magnetic circuit 10b and a structure for fixing the coiled wave springs 8, 9. The coiled wave spring 8, 9 is not fixed to the flange portion 15 provided on the outer peripheral side of the magnetic circuit 10, but a groove 20 formed along a circumferential direction perpendicular to an axial direction is provided on an outer-diameter-side surface of the magnetic circuit 10b defining an outer diameter thereof and the coiled wave spring 8, 9 is fixed to a retaining ring member 21 fitted and fixed to the groove 20.

Specifically, in the internal magnet type magnetic circuit 10b, a yoke 12 has a smaller thickness dimension D2 than the maximum thickness dimension D1 of the magnetic circuit in the axial direction. Moreover, a flange portion protruding outward in the circumferential direction perpendicular to the axial direction is not formed, and the groove 20 easily formed by, e.g., cutting is provided instead at the outer-diameter-side surface. The width and depth of the groove 20 can be set according to the fitted and fixed retaining ring member 21. As compared to the case of providing the flange portion 15 protruding outward in the circumferential direction at the yoke 12 as in the previous embodiment, the yoke 12 can be easily manufactured, and a cost can be reduced.

The retaining ring member 21 provided at the magnetic circuit 10b can be formed using a plate-shaped steel wire similar to that forming the coiled wave spring 8, 9. For example, the retaining ring member 21 of the present embodiment can be formed as a substantially annular member having a slightly smaller inner diameter dimension than the inner diameter dimension of an elastic deformation portion of the coiled wave spring 8, 9 and provided with a cut at a single spot. When the magnetic circuit 10b is inserted into the retaining ring member 21 with the retaining ring member 21 being expanded outward, the retaining ring member 21 can be easily fitted and fixed to the groove 20.

The shape dimensions of the internal magnet type magnetic circuit 10b are dominated by the shape dimensions of the yoke 12, and the maximum thickness dimension D1 of the internal magnet type magnetic circuit 10b is substantially the total height dimension of the yoke 12. The retaining ring member 21 partially protruding outward in the circumferential direction perpendicular to the Z-axis direction is fitted in the groove 20 of the yoke 12. The thickness dimension D4 of the retaining ring member 21 is an extremely-smaller value than the above-described thickness dimension D1.

As described above, the coiled wave springs 8, 9 are in such a shape that the elastic deformation portion 8c does not protrude in an inner diameter direction or an outer diameter direction, and are configured to substantially house the magnetic circuit 10b and the shaft member 7 inside. Thus, a first fixing portion 8a of the coiled wave spring 8 and a first fixing portion 9a of the coiled wave spring 9 are each fixed to both surfaces of the retaining ring member 21. A second fixing portion 8b of the coiled wave spring 8 on the other end side is coupled to a flange member 6 forming the frame. Moreover, a second fixing portion 9b of the coiled wave spring 9 on the other end side is coupled to a frame 3.

The vibrator 1b of the present embodiment is configured such that the magnetic circuit 10b is sandwiched between two coiled wave springs 8, 9 arranged one above the other. Two coiled wave springs 8, 9 are attached to constantly generate restorative force for stretching in a state in which each of the coiled wave springs 8, 9 is biased and compressed to be shorter than a natural length. Thus, drive force generated at a coil 5a arranged in a magnetic gap 11 of the magnetic circuit 10b can vibrate the magnetic circuit 10b and the frame relative to each other. The retaining ring member 21 is a portion protruding to an outer peripheral side of the yoke 12 by the thickness dimension D4, and therefore, the magnetic circuit 10b having the maximum thickness dimension D1 as a greater dimension than the thickness dimension D4 is substantially housed inside the coiled wave springs 8, 9 and is decreased in size.

Note that the vibrator 1b of the present embodiment uses the coiled wave springs 8, 9 as described above, but may include only either one of the coiled wave springs. The vibrator including only either one of the coiled wave springs has an advantage that further size reduction can be realized.

Fourth Embodiment

Figure 7:
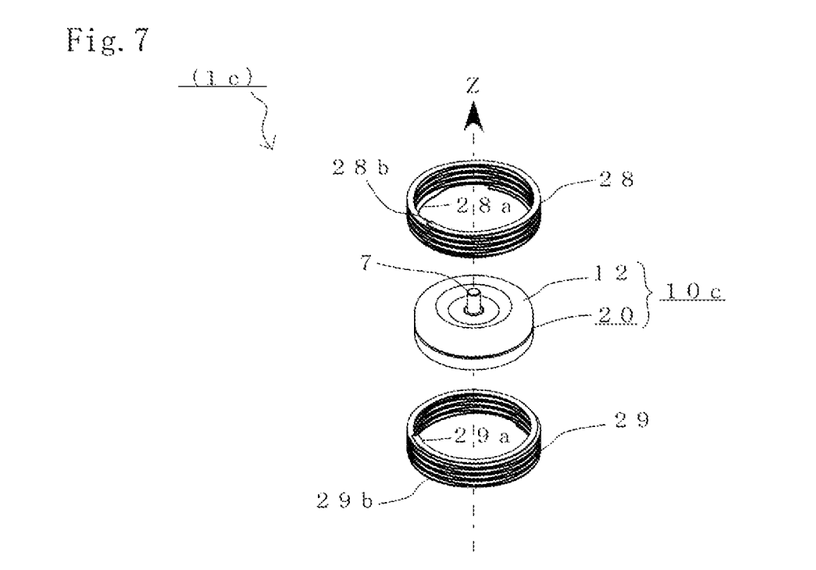
FIG. 7 is a view for describing an internal structure of the vibrator according to still another preferred embodiment of the present invention.

FIG. 7 is an exploded perspective view illustrating only a shaft member 7, coiled wave springs 28, 29, and a magnetic circuit 10c arranged inside a frame of a (not-shown) vibrator 1c according to still another embodiment of the present invention. Note that as in the cases of the above-described embodiments, the same reference numerals are used to represent some configurations unnecessary for description of the present invention, and these configurations are not shown in the figure and are not described. Needless to say, the form of the vibrator 1c is not limited to the case of the present embodiment.

The vibrator 1c of the present embodiment is an electrodynamic vibrator having a substantially cylindrical entire shape and including the internal magnet type magnetic circuit 10c as in the vibrator 1b of the previous embodiment. Note that the vibrator 1c is different from the vibrator 1b of the previous embodiment in a configuration of the magnetic circuit 10c, configurations of the coiled wave springs 28, 29, and a structure for fixing the coiled wave springs 28, 29. The magnetic circuit 10c is coincident with the magnetic circuit 10b on such a point that a groove 20 formed along a circumferential direction perpendicular to an axial direction is provided at an outer-diameter-side surface of a yoke 12 defining the outer diameter thereof. Note that the magnetic circuit 10c does not include a retaining ring member 21 to be fitted and fixed to the groove 20, and the coiled wave spring 28, 29 is directly fixed to the groove 20.

Specifically, the coiled wave spring 28, 29 is configured such that a first fixing portion 28a, 29a as a retaining ring portion is formed to protrude in an inner diameter direction with respect to an elastic deformation portion 28c, 29c. Meanwhile, the coiled wave spring 28, 29 has a greater inner diameter dimension than the outer dimension of the magnetic circuit 10c such that the elastic deformation portion 28c, 29c substantially houses the magnetic circuit 10c and the shaft member 7 inside. A second fixing portion 28b of the coiled wave spring 28 on the other end side or a second fixing portion 29b of the coiled wave spring 29 on the other end side has the substantially same inner diameter dimension as that of the elastic deformation portion 28c, 29c.

Thus, the first fixing portion 28a of the coiled wave spring 28 and the first fixing portion 29a of the coiled wave spring 29 can be fitted and fixed to the groove 20 of the magnetic circuit 10c. The magnetic circuit 10b is inserted with the first fixing portion 28a and the first fixing portion 29a being expanded outward so that the coiled wave spring 28 and the coiled wave spring 29 can be easily fitted and fixed to the groove 20. The second fixing portion 28b of the coiled wave spring 28 on the other end side is coupled to a flange member 6 forming the frame. Moreover, the second fixing portion 29b of the coiled wave spring 29 on the other end side is coupled to a frame 3.

In the case of the present embodiment, the retaining ring member 21 necessary for the case of the previous embodiment can be omitted, and therefore, a manufacturing cost for the vibrator 1c can be further reduced. Moreover, as described above, the coiled wave springs 28, 29 are configured to substantially house the magnetic circuit 10c and the shaft member 7 inside the elastic deformation portions 28c, 29c. Thus, the vibrator 1c of the present embodiment is decreased in size.

Fifth Embodiment

Figure 8:
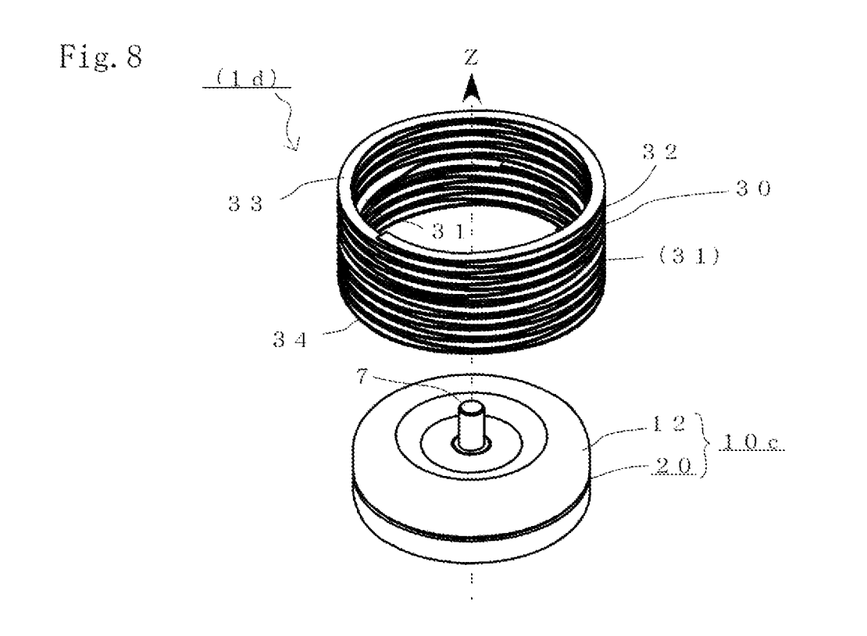
FIG. 8 is a view for describing an internal structure of the vibrator according to still another preferred embodiment of the present invention.

FIG. 8 is an exploded perspective view illustrating only a shaft member 7, a single coiled wave spring 30, and a magnetic circuit 10c arranged inside a frame of a (not-shown) vibrator 1d according to still another embodiment of the present invention. Note that as in the cases of the above-described embodiments, the same reference numerals are used to represent some configurations unnecessary for description of the present invention, and these configurations are not shown in the figure and are not described. Needless to say, the form of the vibrator 1d is not limited to the case of the present embodiment.

The vibrator 1d of the present embodiment is an electrodynamic vibrator having a substantially cylindrical entire shape and including the internal magnet type magnetic circuit 10c similar to that of the vibrator 1c of the previous embodiment. Note that the vibrator 1d is different from the vibrator 1c of the previous embodiment in a configuration of the coiled wave spring 30 and a structure for fixing to the frame and the magnetic circuit 10c.

Specifically, the coiled wave spring 30 is a coiled wave spring configured as if the coiled wave springs 28, 29 of the previous embodiment are integrated. First fixing portions 28a, 29a as retaining ring portions protruding in an inner diameter direction with respect to elastic deformation portions are coupled to each other to form an integrated retaining ring portion 31 at a middle portion of an elastic deformation portion 32. Meanwhile, the coiled wave spring 30 has a greater inner diameter dimension than the outer dimension of the magnetic circuit 10c such that the elastic deformation portion 32 of the coiled wave spring 30 substantially house the magnetic circuit 10c and the shaft member 7 inside. Moreover, a second fixing portion 33 of the coiled wave spring 30 on an upper end side or a second fixing portion 34 of the coiled wave spring 30 on a lower end side has the substantially same inner diameter dimension as that of the elastic deformation portion 32.

That is, the coiled wave spring 30 is configured such that the retaining ring portion 31 with a smaller inner diameter dimension is formed at the middle portion of the tubular elastic deformation portion 32 in a height direction thereof. Thus, the retaining ring portion 31 of the coiled wave spring 30 can be fitted and fixed to a groove 20 of the magnetic circuit 10c. The magnetic circuit 10c is inserted with the retaining ring portion 31 being expanded outward so that the coiled wave spring 30 can be easily fitted and fixed to the groove 20. The second fixing portion 33 of the coiled wave spring 30 is coupled to a flange member 6 forming the frame.

Moreover, the second fixing portion 34 of the coiled wave spring 30 on the other end side is coupled to a frame 3.

In the case of the present embodiment, the coiled wave spring 30 formed by integration of two coiled wave springs can be used to reduce the number of components, and therefore, a manufacturing cost for the vibrator 1d can be further reduced. Moreover, as described above, the coiled wave spring 30 is configured to substantially house the magnetic circuit 10c and the shaft member 7 inside the elastic deformation portion 32. Thus, the vibrator 1d of the present embodiment is decreased in size.

The vibrator of the present invention is not limited to one including the internal magnet type magnetic circuit 10, 10b, 10c, 10d or the external magnet type magnetic circuit 10a as in the above-described embodiments, and may be a vibrator including a repulsive type magnetic circuit or the like. Moreover, the vibrator of the present invention is not limited to the vibrator attached to the flat plate 2 as the attachment target member to reproduce audio, and may be a vibrator configured to apply vibration to an attachment target.

What is claimed is:

1. A vibrator comprising: a shaft member arranged along an axial direction of the coil in the internal space and having both ends supported on the frame; a magnetic circuit arranged slidably relative to the shaft member and having a magnetic gap in which the coil is arranged; and a compression coil spring arranged between one end side of the magnetic circuit and one end side of the frame along the axial direction in the internal space, wherein the compression coil spring is a coiled wave spring configured such that a plate-shaped steel wire is multiple-wound in a spiral shape in a circumferential direction of the shaft member to alternately form a peak portion and a trough portion at an equal interval and the peak portion and the trough portion contact each other in the axial direction, and the magnetic circuit is arranged inside the coiled wave spring, the frame has a frame member and a flange member, and the coiled wave spring is connected on the frame member and the flange member.

2. The vibrator according to claim 1, further comprising: another coiled wave spring arranged between the other end side of the magnetic circuit and the other end side of the frame.

3. The vibrator according to claim 2, wherein each coiled wave spring is attached in a state in which each coiled wave spring is biased and compressed to be shorter than a natural length.

4. The vibrator according to claim 1, wherein the magnetic circuit has a bearing slidable relative to the shaft member.

5. The vibrator according to claim 1, wherein the magnetic circuit includes a yoke having a through-hole through which the shaft member penetrates, a magnet having a through-hole through which the shaft member penetrates and attached to the yoke, and a plate having a through-hole through which the shaft member penetrates and attached to the magnet to form the magnetic gap between the plate and the yoke.

6. The vibrator according to claim 5, wherein a yoke of the magnetic circuit further includes a flange portion having a smaller thickness dimension D2 in the axial direction than the maximum thickness dimension D1 of the magnetic circuit in the axial direction and formed to protrude outward in the circumferential direction perpendicular to the axial direction, the coiled wave spring is fixed to the flange portion, and the flange portion is integrated with the yoke.

7. The vibrator according to claim 5, wherein
the yoke of the magnetic circuit has a groove formed at an outer-diameter-side surface of the yoke defining an outer diameter and along the circumferential direction perpendicular to the axial direction,
a retaining ring member fitted in the groove is further provided, and
the coiled wave spring is fixed to the retaining ring member fitted and fixed to the groove of the yoke.

8. The vibrator according to claim 5, wherein
the yoke of the magnetic circuit has a groove formed at an outer-diameter-side surface of the yoke defining an outer diameter and along the circumferential direction perpendicular to the axial direction, and
the coiled wave spring has a retaining ring portion formed to protrude in an inner diameter direction, and the retaining ring portion is fitted and fixed to the groove of the yoke.

\* \* \* \* \*